Jan. 28, 1930.　　　R. J. BRITTAIN, JR　　　1,745,322
JOURNAL BOX AND CAR FRAME SUPPORT
Filed April 3, 1928　　　2 Sheets-Sheet 1

Inventor:
RICHARD J. BRITTAIN, JR.,
His Attorney.

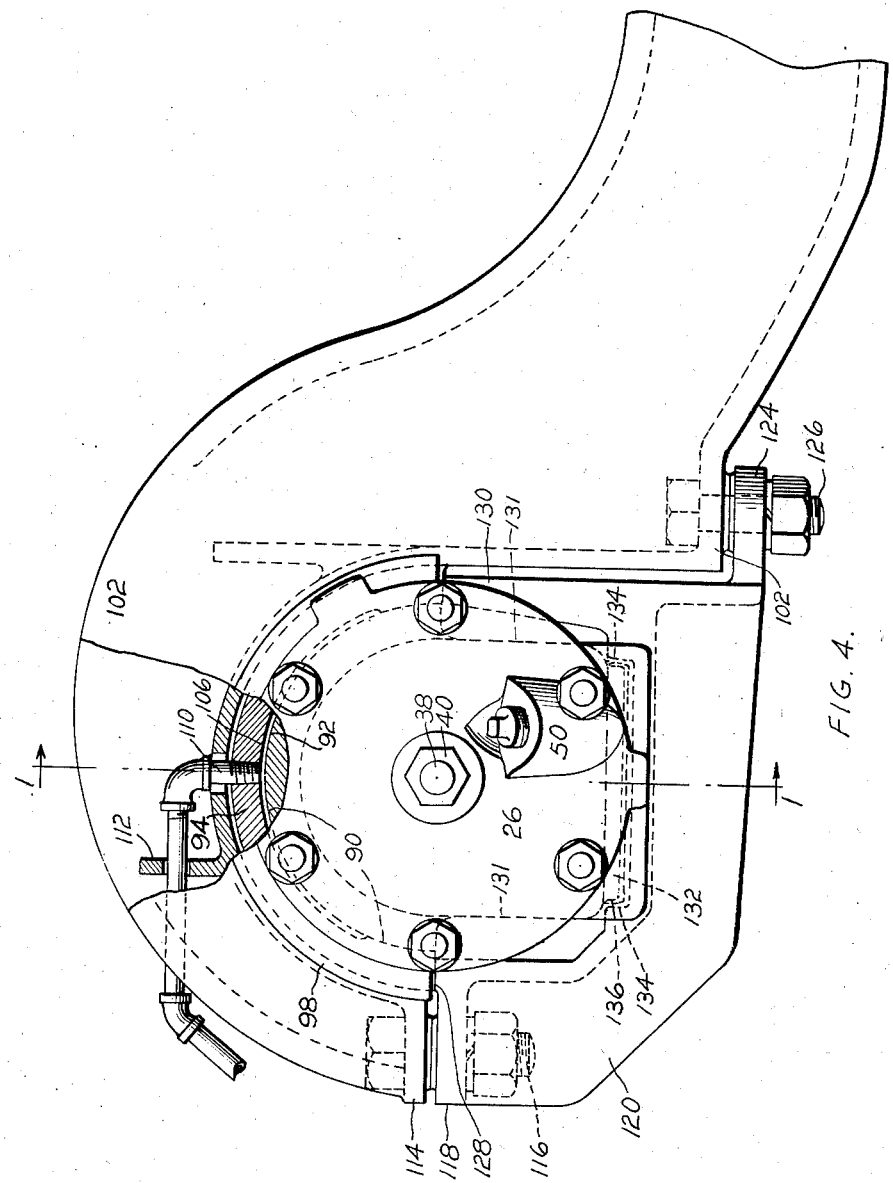

Patented Jan. 28, 1930

1,745,322

UNITED STATES PATENT OFFICE

RICHARD J. BRITTAIN, JR., OF BLOOMFIELD, NEW JERSEY, ASSIGNOR TO GENERAL MOTORS CORPORATION, OF DETROIT, MICHIGAN, A CORPORATION OF DELAWARE

JOURNAL BOX AND CAR-FRAME SUPPORT

Application filed April 3, 1928. Serial No. 266,932.

This invention relates to journal boxes and car frame supports and comprises all the features of novelty herein disclosed. An object of the invention is to provide improved means for supporting a car frame member on an axle box. Another object is to provide an improved device for so mounting an axle box as to allow it free self alignment without cramping of the axle bearing. Another object is to provide an improved guard or shield for the box. To these ends and to improve generally and in detail upon devices of this character, the invention also consists in the various matters hereinafter disclosed and claimed.

The invention, in its broader aspects, is not necessarily limited to the particular embodiment selected for illustration in the accompanying drawings in which Fig. 1 is a vertical, longitudinal section, on line 1—1 of Fig. 4, of an axle box and associated parts.

Fig. 4 is a side elevation, partly cut away and in section, of the axle box and associated parts.

Figure 1:
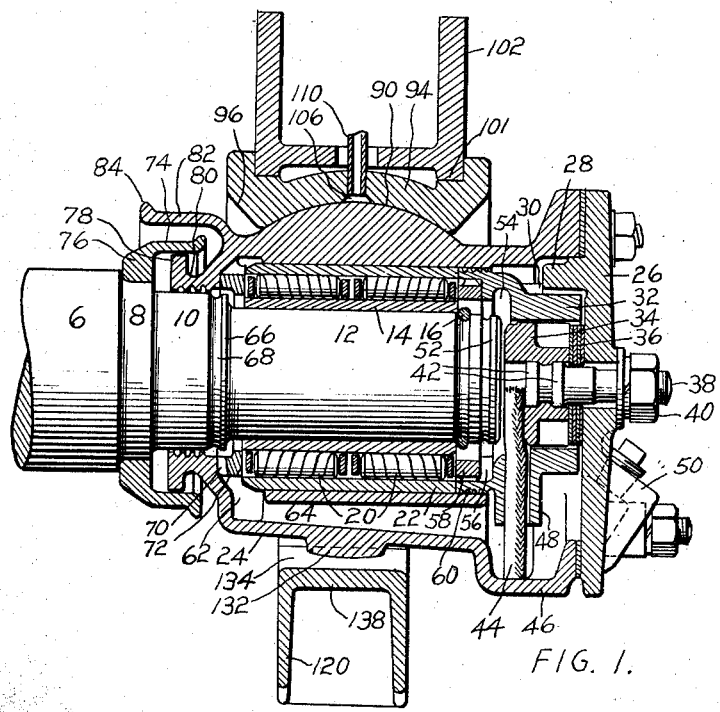
Figures 2, 3:
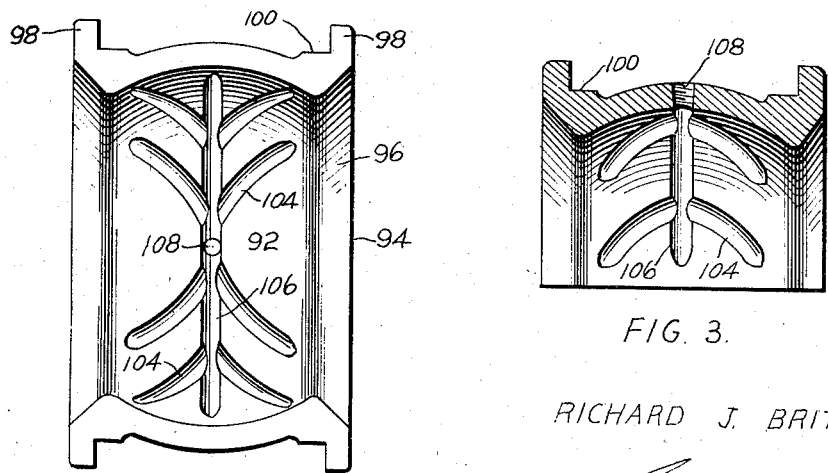
Fig. 2 is a bottom plan view of a seat block.
Fig. 3 is a vertical section of the block.

The numeral 6 indicates a shaft or axle having stepped cylindrical surfaces 8, 10 and 12, a sleeve 14 being pressed or shrunk on the axle and held on the axle by a split ring 16. Two sets of roller bearings 20 are interposed between the sleeve 14 and a lining 22 in the bore of a journal box or casing 24. The outer end of the box has a detachable end cap 26 with a lug 28 extended inwardly into a slot 30 in a retainment ring 32 to hold the latter from rotation. The ring is provided with a square opening to receive a square thrust block 34 and spacing plates 36, the block and plates being clamped to the end cap by a bolt 38 and nut 40. The bolt has square collars 42 cast in a square opening of the thrust block to hold the bolt from working loose. The thrust block is preferably of brass and its inner end face opposes the end face of the axle, lubricant being lifted to the opposing faces by a wick 44. The wick extends from a lubricant reservoir 46 in the box, through a supporting boss 48 on the retainment ring, to a recess in the thrust block. Lubricant is admitted through a hollow boss 50 of the end cap and, after lubricating the thrust face of the axle, collects on a rib 52 and is thrown off into an annular groove 54 of the retainment ring and drains through a notch 56 to a floating ring 58 having cross slots in its outer periphery to conduct the lubricant to the bearings.

The retainment ring has grease grooves at 60 fitting the bore of the box and partitions off the axle and bearings from the reservoir so that the oil must pass through the bearings before returning to the reservoir through a vertical passage 62 and an inclined drain passage or core 64 at the bottom of the box. The inner or rear end of the box has grease grooves closely fitting the surface 10 of the axle and lubricant, working along the axle, is arrested by a rib 66 and a groove 68 and drops through radial cuts 70 in the side of a floating ring 72 to the passage 62.

Water or other foreign matter is excluded from the box by an annular shield 74 having a hub 76 pressed on the surface 8 of the axle. The shield has an out-turned lip and surrounds and encloses a collar or flange 78 which forms a drain groove 80 near the end of the box. The box also has an arcuate skirt or guard 82 covering the shield 74, the end of the skirt having an out-turned lip 84. Thus water and other foreign matter are excluded under all usual conditions.

The top half of the axle box is provided with an integral spherical segment or seat 90 fitting a similar surface 92 on an arcuate seat block or adapter plate 94. The center of curvature of the spherical segment is at the center of the axle. The block 94 has inclined sides 96 providing clearance to let it tilt freely in all directions on the box and its sides terminate in outstanding arcuate ribs 98 bordering semi-cylindrical lands or seats 100 for arcuate ribs or seats 101 on a channelled frame bar 102. To lubricate the spherical seat, the block 94 has a series of grooves 104 branching from a central circumferentially extending groove 106 which receives grease through an opening 108 from a pipe 110 threaded in the opening and having support in a web 112 of the frame bar 102. The groove terminates within the limits of the spherical surface to retain the grease. The frame bar terminates in a web 114 fastened by a bolt 116 to a web 118 on a casting 120 extending under the box and provided with a lug 124 secured by a bolt 126 to the frame bar 102. The bar 102 and casting 120 constitute a frame which encloses the box. The casting 120 has a terminal surface 128 spaced slightly from the lower end of the seat block and, at the other side of the box, the casting has an upwardly extending plate portion 130 with a flat terminal surface similarly spaced from the other lower end of the seat block. Hence, the frame can tilt a little around the arcuate block. The sides of the box below the segment 90 are flattened as indicated at 131 and the box is held from excessive turning in the frame by a lug or projection 132 which extends down between spaced surfaces 134 on the casting 120. The lug has its side surfaces 136 somewhat crowned, as indicated in Fig. 4, to allow the box to swing a little on the vertical axis provided by the spherical seat. The lug is also crowned on its under surface and spaced from the web 138 of the casting 120 so that the box can also swing on a horizontal axis afforded by the spherical seat. The spherical seat gives the axle box and frame the proper freedom to prevent an unbalanced load and cramping of the axle bearings.

I claim:

1. In a device of the character described, in combination, a journal box having a spherical segment formed on its upper half, an arcuate seat block extending around the upper half of the box and having a segmental inner surface fitting the segment on the box, and a frame seated on the block and surrounding the box; substantially as described.

2. In a device of the character described, in combination, a journal box having a spherical segment formed on its upper half, an arcuate seat block extending around the upper half of the box and having a segmental inner surface fitting the segment on the box, a frame bar mounted on the seat block, and a casting secured to the frame bar and enclosing the lower half of the box; substantially as described.

3. In a device of the character described, in combination, a journal box having a spherical segment formed on its upper half, an arcuate seat block extending around the upper half of the box and having a segmental inner surface fitting the segment on the box, a frame bar arched over the box and mounted on the seat block, a casting secured to the frame bar and enclosing the lower half of the box, and a projection at the bottom of the box entered between spaced surfaces on the casting; substantially as described.

4. In a device of the character described, in combination, a journal box having a spherical segment formed on its upper half, an arcuate seat block extending around the upper half of the box and having a segmental inner surface fitting the segment on the box, a frame bar arched over the box and mounted on the seat block, a casting secured to the frame bar and enclosing the lower half of the box, a projection at the bottom of the box entered between spaced surfaces on the casting, and the engaging surfaces of the projection and the casting being crowned, one with respect to the other; substantially as described.

5. In a device of the character described, in combination, a journal box having a spherical segment formed on its upper half, an arcuate seat block extending around the upper half of the box and having an inner segmental surface fitting the segment on the box, a frame bar arched over the box and mounted on the seat block, and a casting secured to the frame bar, the casting enclosing the lower part of the box and having terminal surfaces to engage ends of the seat block; substantially as described.

6. In a device of the character described, in combination, a journal box having a spherical segment formed on its upper part, an arcuate seat block extending over the upper part of the box and having an inner segmental surface fitting the segment on the box to allow relative rocking of the box and block in all directions, a frame mounted on the seat block and surrounding the box, and interengaging faces on the frame and the lower part of the box, said faces having a small initial clearance to limit the relative rocking circumferentially of the box; substantially as described.

7. In a device of the character described, in combination, a journal box having a flattened lower portion and a spherical segment on its upper portion, the center of the spherical surface lying at the center of the box, a seat block conforming to the spherical segment on the upper half of the box, and a frame enclosing the box and the seat block and having surfaces at opposite sides of the box to engage the ends of the seat block; substantially as described.

8. In a device of the character described, in combination, a journal box having a spherical segment formed on its upper half, a seat block extending around the upper half of the box and having an inner segmental surface fitting the segment on the box, the sides of the block having outwardly extending ribs, and a frame bar having an arcuate portion seated on the block between the ribs; substantially as described.

9. In a device of the character described, in combination, a journal box having a spherical segment formed on its upper half, a seat block extending around the upper half of the box and having an inner segmental surface fitting the segment on the box, the block having arcuate external seats and outwardly extending ribs at the sides of the seats, and a frame bar having arcuate seats mounted on the seats of the block and retained by the ribs; substantially as described.

10. In a device of the character described, in combination, a journal box having a spherical segment formed on its upper portion, a seat block extending around the upper portion of the box and having an inner segmental surface fitting the segment on the box, the segmental surface having a central groove and laterally extending branch grooves, the block having an opening for admitting lubricant to the grooves, and a frame bar seated on the block; substantially as described.

11. In a device of the character described, in combination, a journal box having a spherical segment formed on its upper portion, a seat block extending around the upper portion of the box and having an inner segmental surface fitting the segment on the box, one of the engaging segmental surfaces having grooves with an opening leading to the grooves, and a frame bar seated on the block; substantially as described.

12. In a device of the character described, in combination, a journal box having a spherical segment formed on its upper portion, a seat block extending around the upper portion of the box and having an inner segmental surface fitting the segment on the box, one of the engaging segmental surfaces having a central groove with laterally extending branch grooves, the grooves terminating within the area of the segmental surface, and a frame bar seated on the block; substantially as described.

13. In a device of the character described, in combination, a journal box, an axle journalled in the box, the end of the box fitting the axle and having a collar forming a drain groove, an annular shield fixed on the axle and surrounding the collar, and an arcuate guard extending from the box over the annular shield and having an out-turned lip; substantially as described.

14. In a device of the character described, in combination, a journal box, a frame bar, and an arcuate seat block between the frame bar and the box, the seat block having an arcuate seat on its under surface fitting a corresponding seat on the box to allow relative tilting movement between the box and the seat block, and the seat block having an arcuate seat extending around its outer periphery and fitting an arcuate surface on the frame bar; substantially as described.

15. In a device of the character described, a seat block of generally arcuate form having one of its surfaces formed as a spherical segment, the other surface of the block having a semi-cylindrical seat; substantially as described.

16. In a device of the character described, a seat block of generally arcuate form having one of its surfaces formed as a spherical segment, the other surface of the block having spaced semi-cylindrical seats, and arcuate side ribs bordering the sides of said seats; substantially as described.

17. In a device of the character described, in combination, a journal box having an arcuate upper surface, a seat block extending around the upper portion of the box and having a surface fitting the arcuate surface of the box, one of the engaging surfaces having branching grooves terminating within the area of the surface, and a frame bar seated on the block; substantially as described.

18. In a device of the character described, in combination, a journal box having an arcuate upper surface, a seat block extending around the upper portion of the box and having a surface fitting the arcuate surface of the box, one of the engaging surfaces having grooves with an opening leading to the grooves, a frame bar seated on the block, and means for conducting lubricant to the opening; substantially as described.

In testimony whereof I hereunto affix my signature.

RICHARD J. BRITTAIN, Jr.